United States Patent
Naish et al.

(10) Patent No.: US 7,197,482 B2
(45) Date of Patent: Mar. 27, 2007

(54) METHOD AND APPARATUS FOR CUSTOMER STOREFRONT OPERATIONS

(75) Inventors: Vicki D. Naish, Fountain Hills, AZ (US); Nicholas R. Purzer, Tempe, AZ (US); David A. Reynolds, Scottsdale, AZ (US); Louisa W. Yeung, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1072 days.

(21) Appl. No.: 09/839,037

(22) Filed: Apr. 19, 2001

(65) Prior Publication Data

US 2002/0156706 A1    Oct. 24, 2002

(51) Int. Cl.
*G06Q 30/00* (2006.01)

(52) U.S. Cl. .......................................... 705/28; 705/29
(58) Field of Classification Search ................. 705/28, 705/29; 700/107
See application file for complete search history.

(56) References Cited

U.S. PATENT DOCUMENTS

| | | | | | |
|---|---|---|---|---|---|
| 4,887,208 | A | * | 12/1989 | Schneider et al. | 705/28 |
| 5,611,051 | A | * | 3/1997 | Pirelli | 705/10 |
| 5,732,401 | A | * | 3/1998 | Conway | 705/29 |
| 5,805,455 | A | * | 9/1998 | Lipps | 700/231 |
| 5,886,634 | A | * | 3/1999 | Muhme | 340/572.1 |
| 5,930,766 | A | * | 7/1999 | Gibb | 705/15 |
| 6,057,756 | A | * | 5/2000 | Engellenner | 340/505 |
| 6,098,050 | A | * | 8/2000 | Knoblock et al. | 705/28 |
| 6,108,588 | A | * | 8/2000 | McGrady | 700/231 |
| 6,151,536 | A | * | 11/2000 | Arnold et al. | 700/237 |
| 6,220,509 | B1 | * | 4/2001 | Byford | 235/375 |
| 6,272,394 | B1 | * | 8/2001 | Lipps | 700/231 |
| 6,330,971 | B1 | * | 12/2001 | Mabry et al. | 235/383 |
| 6,388,569 | B1 | * | 5/2002 | Engellenner | 340/505 |
| 6,486,439 | B1 | * | 11/2002 | Spear et al. | 219/136 |
| 6,487,479 | B1 | * | 11/2002 | Nelson | 701/29 |

(Continued)

FOREIGN PATENT DOCUMENTS

GB     2214673    *    6/1989

OTHER PUBLICATIONS

"-ITS: ITS unveils Allas a unique global service management sysytem"; Presswire, May 18, 1998.*

(Continued)

*Primary Examiner*—Joseph A. Fischetti
(74) *Attorney, Agent, or Firm*—McDonnell Boehnen Hulbert & Berghoff LLP

(57) ABSTRACT

A method and apparatus for managing a decentralized part supply system via a wide area network. A supplier and a customer establish a secure area at the customer's facility. The supplier ships parts to the secure area and the customer stores the parts in the secure area until the customer issues the parts for the customer's use. The supplier and the customer cooperate in managing a secure area inventory database using a virtual storefront. The business rules, database access processes, and user interfaces for the virtual storefront are implemented on a server and accessed by the supplier and the customer via the wide area network.

10 Claims, 17 Drawing Sheets

U.S. PATENT DOCUMENTS

| | | | |
|---|---|---|---|
| 6,492,905 B2 * | 12/2002 | Mathias et al. | 340/540 |
| 6,493,724 B1 * | 12/2002 | Cusack et al. | 707/104.1 |
| 6,550,674 B1 * | 4/2003 | Neumark | 235/383 |
| 6,560,508 B1 * | 5/2003 | Radican | 700/214 |
| 6,609,047 B1 * | 8/2003 | Lipps | 700/231 |
| 6,614,349 B1 * | 9/2003 | Proctor et al. | 340/572.1 |
| 6,639,156 B2 * | 10/2003 | Luke et al. | 177/25.13 |
| 6,658,322 B1 * | 12/2003 | Frederick et al. | 700/236 |

OTHER PUBLICATIONS

Gateway Internet Solutions Ltd., Intalogik Management System Overview (4 pages), Dec. 14, 2000, Internet printout.

Intalogik Limited Online Tracking System (7 pages), Internet printout.

Intalogik.com, screen captures of Website, Customs Invoice (49 pages).

* cited by examiner

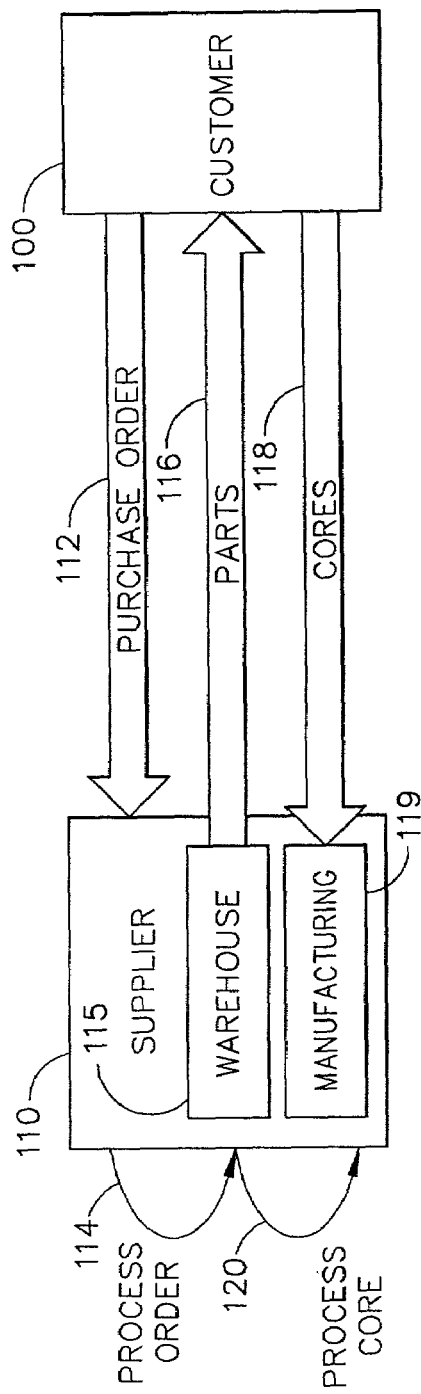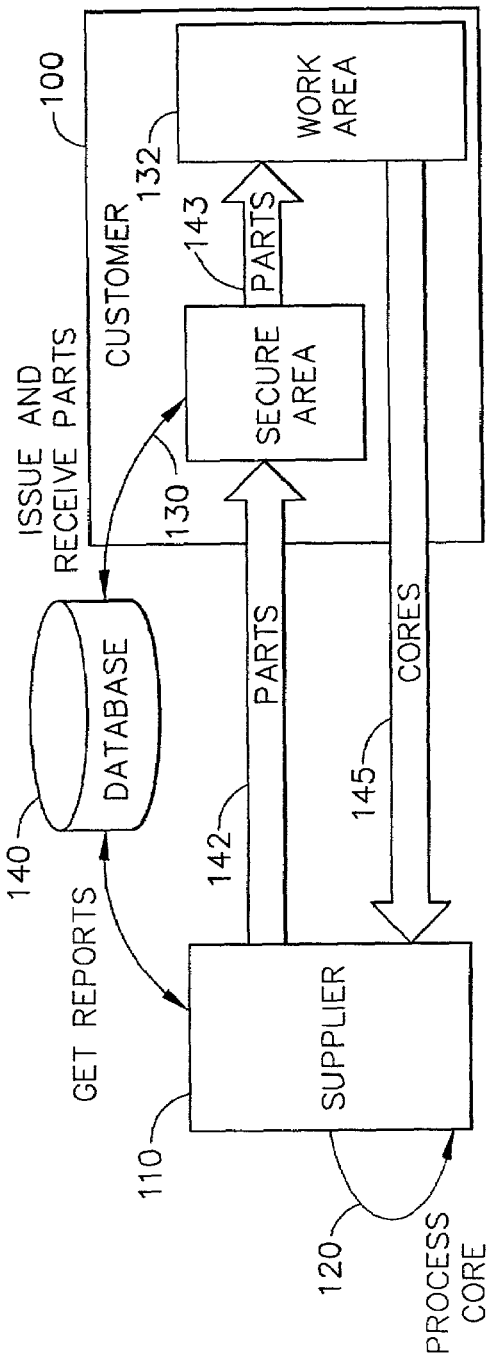
FIG. 1A
FIG. 1B

FIG. 8

REQUESTING TRANSACTION HISTORY BY PART NUMBER

FIG. 11

CORE DISPOSITION

STOREFRONT

CONTACT CUSTOMER

CUSTOMER STOREFRONT OPERATIONS

HOME CONTACT

CUSTOMER / ALLIANCE

- ISSUE
- RECEIVE
- CORES
- INVENTORY
- HISTORY
- ADMINISTRATION
- STOREFRONT INFORMATION

StoreFront Core Disposition

Core Disposition — 1320

Please indicate the disposition of this core or cores. Only one disposition type (scrap or rework) may be entered at a time.

Part: ___ — 1322
Quantity: ___ — 1324

Scrap: ○ These cores have been scrapped. — 1326
Replenishment parts must be ordered from [Supplier] through your normal purchasing process.

Rework: ○ These cores have been returned to [Supplier] for repair. — 1328
P.O. Number: ___ — 1330
Waybill: ___ — 1332
Carrier: [▼] — 1334

[Record] [Cancel] [Reset] — 1336

FIG. 13

METHOD AND APPARATUS FOR CUSTOMER STOREFRONT OPERATIONS

BACKGROUND OF THE INVENTION

This invention relates generally to the field of part supply management systems and specifically to managing a decentralized part supply system via a wide area network.

A warehouse serves as a load balancing system matching the output of a supplier to the demands of a customer. The supplier creates parts and keeps the parts in a warehouse until the supplier receives a purchase order from a customer requesting a part from a customer. The supplier then pulls the requested part from the warehouse and ships the requested part to the customer. The customer receives the requested part, taking possession of it, and pays the supplier for the part.

A supplier typically keeps a few centralized warehouses in strategically located areas so as to be close to the supplier's customers. However shipping delays may cause the customer to wait for the requested part to be shipped from the warehouse by the supplier to the customer.

In time critical operations, such as the repair of aircraft engines used for commercial purposes, any shipping delay may be unacceptable. Therefore, decentralized part supply systems have evolved wherein the supplier ships to a particular customer parts that are owned by the supplier but are kept on the particular customer's premises in a secure area. The customer only takes possession of parts the customer issues from the secure area. The supplier keeps the secure area stocked with replenishment shipments of parts based on the number of parts the customer issues from the secure area. This creates a decentralized part supply system allowing the demands of a particular customer to be readily met by the supplier.

A decentralized part supply system may generate new management difficulties for the supplier and the customer. A supplier should be able to track the number of parts in a customer's secure area in order to make replenishment shipments. Preferably, the supplier should be able to monitor the inventory in the secure area without having to physically travel to the secure area and take inventory. The supplier should also know when a customer takes possession of a part when the customer issues a part from the secure area. Furthermore, customers may need to know if a replenishment shipment is in transit to the secure area when the number of parts falls below the customer's expected requirements. Finally, both the supplier and the customer may want to coordinate their activities with regard to the secure area in order to ensure efficient operation of the secure area.

The maintenance and repair of commercial aircraft may place an additional demand on a decentralized part supply system. An aircraft may be maintained or repaired using either new or rebuilt parts. A part that is designed so that it may be rebuilt a number of times is called a rotable part or simply a rotable. A part may be placed in service in an aircraft until wear on the part exceeds certain threshold values. The part may then be removed from service, rebuilt, and flight certified for use again. Therefore, at any given time, a secure area being used as a portion of the decentralized part supply system may contain both new and rebuilt parts. A supplier and a customer may need to know whether or not a part is new or a rebuilt part and may want to track a particular rebuilt part during its useful lifetime. Additionally, a worn rotable may be returned to the supplier as a core. In some cases, the worn part may be unsuitable for use as a core and the part is scrapped. Both the supplier and customer may need to know that a particular part was scrapped and that the customer needs to take a new part instead of a rebuilt part. Finally, the cost of a rebuilt part and a new part are usually different and both the supplier and the customer may need to know whether new or rebuilt parts are being issued in order for an accurate accounting to be made.

Prior systems attempted to increase the availability of rebuilt parts by allowing multiple suppliers to bid for a customer's rebuildable parts and by improving the visibility of the rebuilding and shipping process. One such system, created by Honeywell Inc., is an Internet based system known as Intalogik.

Using the services of Intalogik, customers solicit bids from suppliers for rebuilding used parts. Interested suppliers submit bids to a customer and the customer selects a supplier from among the interested suppliers based on the submitted bids. The customer then ships the used parts to the selected supplier for rebuilding.

The customer then uses the Intalogik system to track the progress of the rebuilding process while the part is at the supplier's site. The supplier is reminded by the Intalogik of impending deadlines and customer requests for status updates.

Once a used part is rebuilt, it is shipped back the customer and the customer receives an in-transit tracking number. The customer uses the in-transit tracking number to track the rebuilt part throughout the shipping process.

While Intalogik does improve the availability and visibility of rebuildable parts, it does not provide for the management of a decentralized part supply system.

Therefore, it would be advantageous to develop a system for managing a decentralized part supply system containing new and rebuilt parts.

SUMMARY OF THE INVENTION

In one aspect of the present invention, the transfer of parts stored in a secure area by a supplier to a customer is managed by a storefront Web site. The customer and the supplier access the storefront Web site via the Internet. The supplier provides a storefront database that may include secure area inventory information. The supplier also provides a storefront Web server operably coupled to the storefront database and operably coupled to the Internet. The storefront server serves Web pages comprising the storefront Web site. A customer may use a browser program hosted by a customer client to access the storefront Web site. The supplier ships parts to the customer and the customer receives the parts into the secure area and sends information about the received parts to the storefront Web site. The storefront Web site updates the storefront database using the information about the received parts sent by the customer.

When the customer wants to take possession of a part, the customer issues the part from the secure area and sends information about the issue transaction to the storefront Web site. The storefront Web site updates the storefront database using the part issuing information.

In another aspect of the present invention, the supplier transmits a waybill number for a customer's shipment to the storefront Web site and the storefront Web site stores the waybill number in the storefront database. The customer accesses the storefront Web site and receives the waybill number. The waybill number may then be used by the customer to track an in-transit shipment.

In another aspect of the present invention, the storefront Web site generates a part invoice that is transmitted to the customer whenever the customer issues a part.

In another aspect of the present invention, the parts stored in the secure area comprise rotable and new parts. A storefront operation generates a new part invoice if a new part is issued by the customer or a rebuild service invoice if the customer issues a rebuilt part from the secure area.

In another aspect of the present invention, the storefront Web site credits the customer for the number of rotable part cores sent by the customer to the supplier. When a customer requests a quantity of rebuilt parts to be issued from the secure area, the storefront Web site compares the quantity of rotable parts to be issued to the rotable part core credits held by the customer. If the quantity of rotable parts to be issued is greater than the customer rotable part core credit, the storefront Web site terminates the transaction to avoid issuing more rotable parts from the secure area than the customer is entitled to.

DESCRIPTION OF THE DRAWINGS

These and other features, aspects, and advantages of the present invention will become better understood with regard to the following description, appended claims, and accompanying drawings where:

FIG. 1A is a schematic of a typical supplier/customer relationship;

FIG. 1B is a schematic of a supplier/customer relationship according to the present invention;

FIG. 8 is an inventory report request document within an embodiment of a storefront system according to the present invention;

FIG. 11 is transaction history request document within an embodiment of a storefront system according to the present invention;

FIG. 13 is a core disposition document within an embodiment of a storefront system according to the present invention;

DETAILED DESCRIPTION OF THE INVENTION

Figure 2:
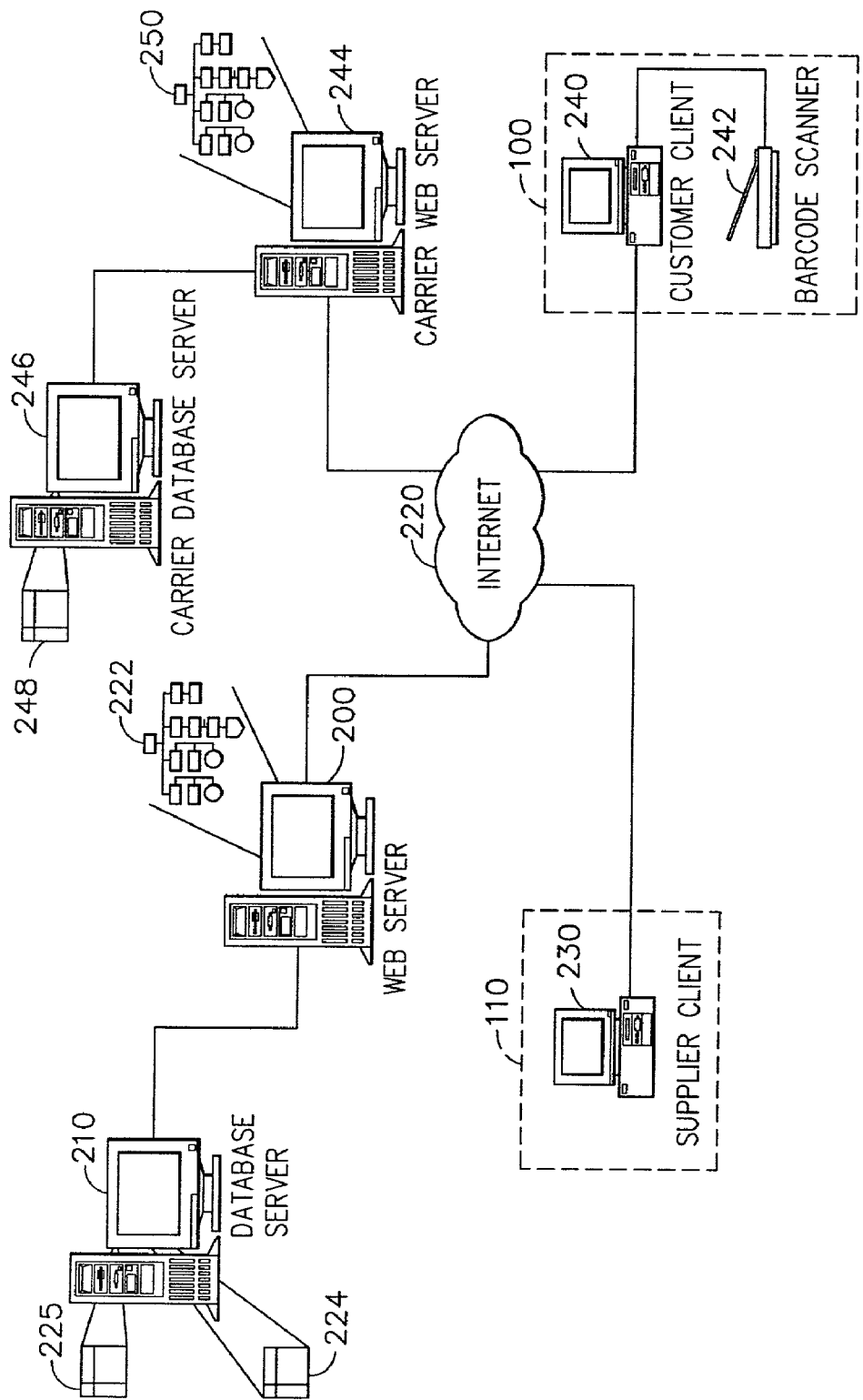
FIG. 2 is a deployment diagram of an embodiment of a storefront system according to the present invention.

FIG. 1A is a schematic of a typical supplier/customer relationship. A customer 100 requests parts from a supplier 110 by sending a purchase order 112 to the supplier. The supplier processes the purchase order 114 and sends parts 116 to the customer. The customer returns cores 118 to the supplier and the supplier processes the cores 120. In this supplier/customer relationship, the supplier produces, rebuilds, and stores an inventory of parts at a supplier warehouse. The customer only receives parts when the customer orders the parts. One aspect of this relationship is that the supplier keeps on hand enough parts in inventory to supply a customer's needs. Another aspect of this relationship is that there is a delay between the customer issuing a purchase order and the customer receiving parts.

FIG. 1B is a schematic of a supplier/customer relationship according to the present invention. In this relationship, a customer 100 establishes a distributed warehouse in the form of a secure area 130 at the customer's facilities. The secure area is accessible to work areas 132 where parts stored in the secure area are used by the customer. The secure area provides a location at the customer's facilities where a supplier 110 can ship parts to and receive cores from. One aspect of the secure area is that the customer does not take possession of the parts in the secure area, instead, the supplier retains possession of the parts in the secure area. Therefore, the customer is not billed for parts stored in the secure area until the parts are used by the customer in the work area.

The management responsibilities of the secure area are shared by the supplier and the customer. The management of the secure area may be coordinated through a shared database 140 accessible to the customer and the supplier. The shared database comprises a neutral data format that is not dependent on either the supplier's or the customer's legacy database systems. The shared database is thus a neutral database from which both the customer and the supplier obtain auditing and financial information. The shared neutral database is herein termed a "storefront" database because the shared database is used to create a virtual storefront to service the customer's parts requirements. The storefront database includes transaction histories for generating transaction and part usage reports.

In another embodiment of a storefront database, either the customer or the supplier integrates the storefront Web site with a legacy database system. In this case, either the supplier or the customer assumes the responsibility of managing the secure area inventory data.

The supplier ships a part 142 to the customer. The customer receives the part into the secure area and updates the database. To take possession of a part, the customer issues a part from the secure area and updates the database indicating that a part 143 has been issued from the secure area and sent to a work area. The customer is billed for parts issued from the secure area. The customer sends cores 145 from the work area to the supplier and the supplier rebuilds 120 the cores for return as useable parts to the customer.

In one embodiment the storefront database, the supplier and customer are able to monitor the inventory in the secure area. For example, the supplier monitors the database and knows when the number of parts in the secure area falls below a minimum number. In this case the supplier initiates a resupply shipment to the customer and the customer receives the shipment into the secure area.

In another embodiment of a storefront system according to the present invention, purchase orders, part information, and bar codes on parts shipments are encoded and exchanged between the customer and the supplier according to SPEC 2000, an Electronic Data Interchange (EDI) standard.

In another embodiment of a storefront system according to the present invention, the secure area is located at a neutral site that is not controlled by the customer or the supplier. A neutral site may be chosen because it is geographically more convenient to the supplier or customer or a customer may wish to share a neutral site with another customer.

FIG. 2 is a deployment diagram of one embodiment of the present invention. The previously described storefront database 224 is maintained on a database server 210 by a supplier. Both the supplier and a customer access the database server using a Web server 200 accessible via a wide area network such as the Internet 220. The Web server provides a user interface in the form of a storefront server including documents 222 for accessing the storefront database hosted by the database server. Customers and suppliers use the user interface to access and modify the storefront database.

Figure 17:
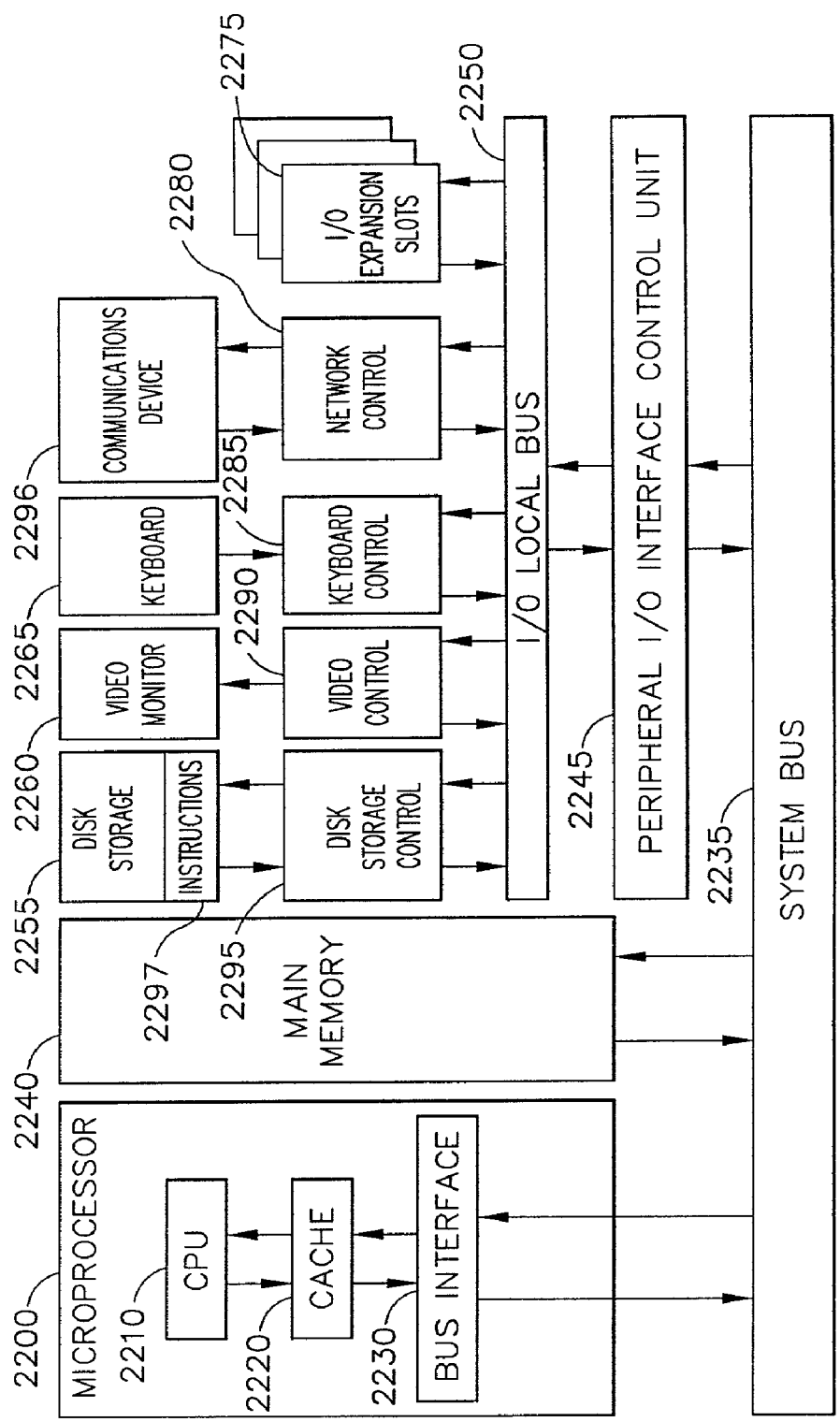
FIG. 17 is an embodiment of a general purpose computer suitable for use as a Web server hosting a storefront server.

FIG. 17 is an embodiment of a general purpose computer suitable for use as a Web server hosting a storefront server. Microprocessor 2200, comprised of a Central Processing Unit (CPU) 2210, memory cache 2220, and bus interface 2230, is operatively coupled via system bus 2235 to main memory 2240 and I/O control unit 2245. The I/O interface control unit is operatively coupled via I/O local bus 2250 to disk storage controller 2295, video controller 2290, keyboard controller 2285, and network controller 2280.

The disk storage controller is operatively coupled to disk storage device 2225. The video controller is operatively coupled to video monitor 2260. The keyboard controller is operatively coupled to keyboard 2265.

The network controller is operatively coupled to communications device 2296. The communications device is adapted to allow software objects, such as a server, hosted by the general purpose computer to communicate via a computer network with other software objects such as a client.

Computer program instructions 2297 implementing a storefront server are stored on the disk storage device and the microprocessor retrieves the computer program instructions and stores them in the main memory. The microprocessor then executes the computer program instructions stored in the main memory to implement the storefront server.

Referring again to FIG. 2, a Web server 200 is operably coupled to a database server 210 and the Internet 220. The Web server hosts a storefront Web server including documents 222 implementing a virtual storefront process for managing a secure area. The Web site comprises business rules, database access processes, and user interfaces for both the supplier and the customer. A storefront database 224 hosted by the database server contains data used by the virtual storefront process.

A supplier at a supplier site 110 accesses the Web server using a supplier client 230 hosting a client application such as a Web browser. The supplier uses the supplier client to request, receive, and display documents served by the Web server. The content of the documents comprise a supplier user interface into the storefront database hosted by the database server. The supplier uses the supplier user interface to view the available parts inventory at the previously described secure area located on a customer's facilities and to request a transaction report detailing the parts received and issued to and from the secure area by the customer.

A customer at a customer site 100 accesses the Web server using a customer client 240 hosting a client application such as a Web browser. The customer uses the customer client to request, receive, and display documents served by the Web server. The content of the documents comprise a customer user interface. The customer uses the customer user interface to view the available parts inventory in the previously described secure area located at the customer's facilities and to request a transaction report detailing the parts received and issued to and from the secure area by the customer. Additionally, the customer uses the customer user interface to receive and issue parts to and from the previously described secure area. The customer user interface is herein termed a storefront because the customer user interface is intended to be a virtual storefront for the secure area.

In an embodiment of a storefront system according to the present invention, a barcode scanner 242 may be operably connected to the customer client to facilitate part data entry when parts are received and issued from and to the secure area.

In an embodiment of a storefront system according to the present invention, a supplier supports multiple customers from a single storefront. To do so, the supplier maintains a customer profile database 225. The customer profile database contains customer profile information associated with customer identification information including a customer identifier. The customer profile information includes document customization information such as special graphics, text, and data unique to a customer. The customization information is used to customize the storefront for each customer so that a customer perceives the storefront as being unique to that customer.

When a customer accesses the system, the customer is asked for a customer identifier and a password. The storefront system uses the customer identifier to generate customized documents served to the customer's client.

The customer profile database also contains customer security information for each customer so that a customer only sees secure area inventory information for that customer.

In one embodiment of a storefront system according to the present invention, a shipping carrier Web server 244 may be accessed through the Internet to track in-transit shipments between the supplier and the customer. The carrier Web server is operably coupled to a carrier database server 246. The carrier database server comprises an in-transit database 248 including detailed information about a parts shipment. The carrier Web server serves a series of documents 250 to implement an in-transit query interface.

A supplier stores part shipment information including a waybill number and a quantity shipped in the storefront database. The supplier transmits the waybill number for a part shipment to a customer and the customer uses the waybill number to access information about the part shipment from the carrier Web server. The waybill number is transmitted to the customer in the form of a waybill link to the carrier Web server in a document displayed on a customer's client. The document is generated by the storefront Web server. The customer selects the link and a Web page is retrieved from the carrier Web server comprising in-transit information for a part shipment.

Figure 3:
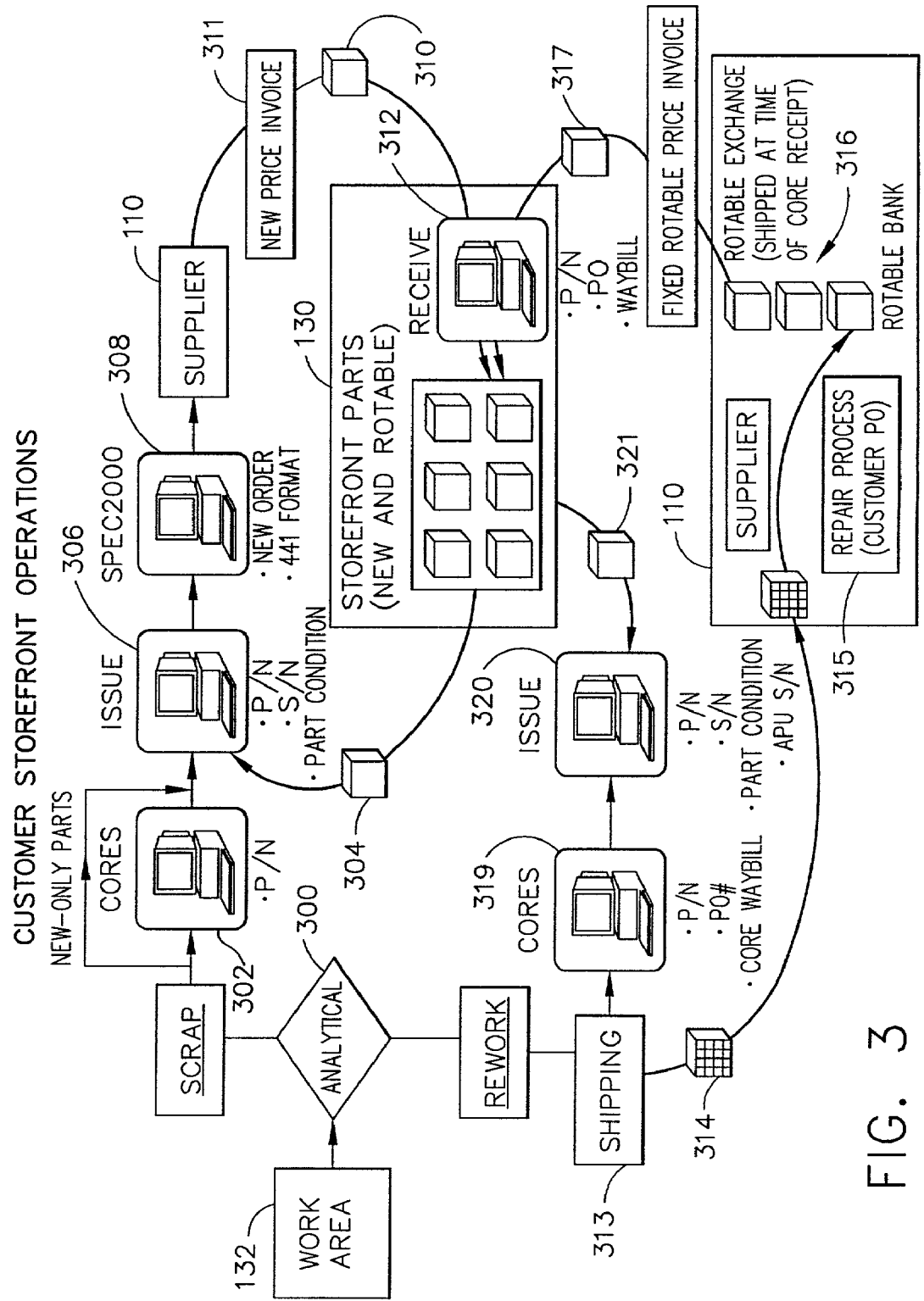
FIG. 3 is a process flow diagram illustrating the flow of information, parts, and cores within an embodiment of a storefront system according to the present invention.

FIG. 3 is a process flow diagram illustrating the flow of information, new and rotable parts, and cores in one embodiment of the invention. A used part is obtained from a work area 132 and inspected 300. If the used part is not suitable for re-manufacturing because it is too badly worn or damaged, then the core is marked as scrap.

If a part is scrapped, then a new part must be issued from the secure area. To do so, a part pick request is received from the work area. The customer issues a part 304 from a secure area 130 and records that the part has been pulled thereby closing the pick request. The part is issued from the secure area and the new part's part number, serial number, and condition are entered 306 into the previously described storefront database. Pulling the new part from the secure area constitutes a sale of the new part to the customer. In the case of sale, the supplier sends a generated invoice 311 to the customer for the new part.

If a part is scrapped, its disposition and part number is entered 302 by the customer into the storefront database for tracking purposes.

Each time a part is issued from the secure area, the inventory levels are adjusted. If an inventory level falls below a minimum level set by the customer, a message 308 is sent to the supplier 110 and the supplier initiates a replenishment shipment including replenishment parts 310 for the secure area.

The replenishment shipment including the replenishment part is received 312 by the customer into the secure area. The customer enters the part data into the storefront database using a Web site interface. The part data includes the part number, and the number of parts added to the inventory.

In one embodiment of the present invention, the part's shipping label contains the part number and number of parts shipped in a barcode format. The barcode format is entered by the customer using a barcode scanner thus facilitating rapid part data entry.

The reception of the part into the secure area is accomplished by the customer using a Web interface to update the storefront database.

If the analysis 300 of the used part indicates that the used part can be re-manufactured, the used part is shipped 313 as a core 314 to the supplier. The supplier accepts the core and re-manufactures it 315. The supplier keeps a supply of rotable parts in a rotable bank 316. The supplier ships a rotable part 317 to the customer where the customer receives 312 the rotable part into the secure area 130. The supplier generates a rotable part invoice 318 and sends the rotable part invoice to the customer.

The customer enters 319 the core's part number into the storefront database and a purchase order number is assigned to it. The waybill of the core is recorded as well for tracking purposes. The customer issues 320 a rebuilt rotable part 321 from the secure area and the issued rotable part's part number, serial number, and condition are entered into the storefront database. Additionally, the serial number of the assembly to which the issued rotable part will be used in is entered into the storefront database.

Figure 4:
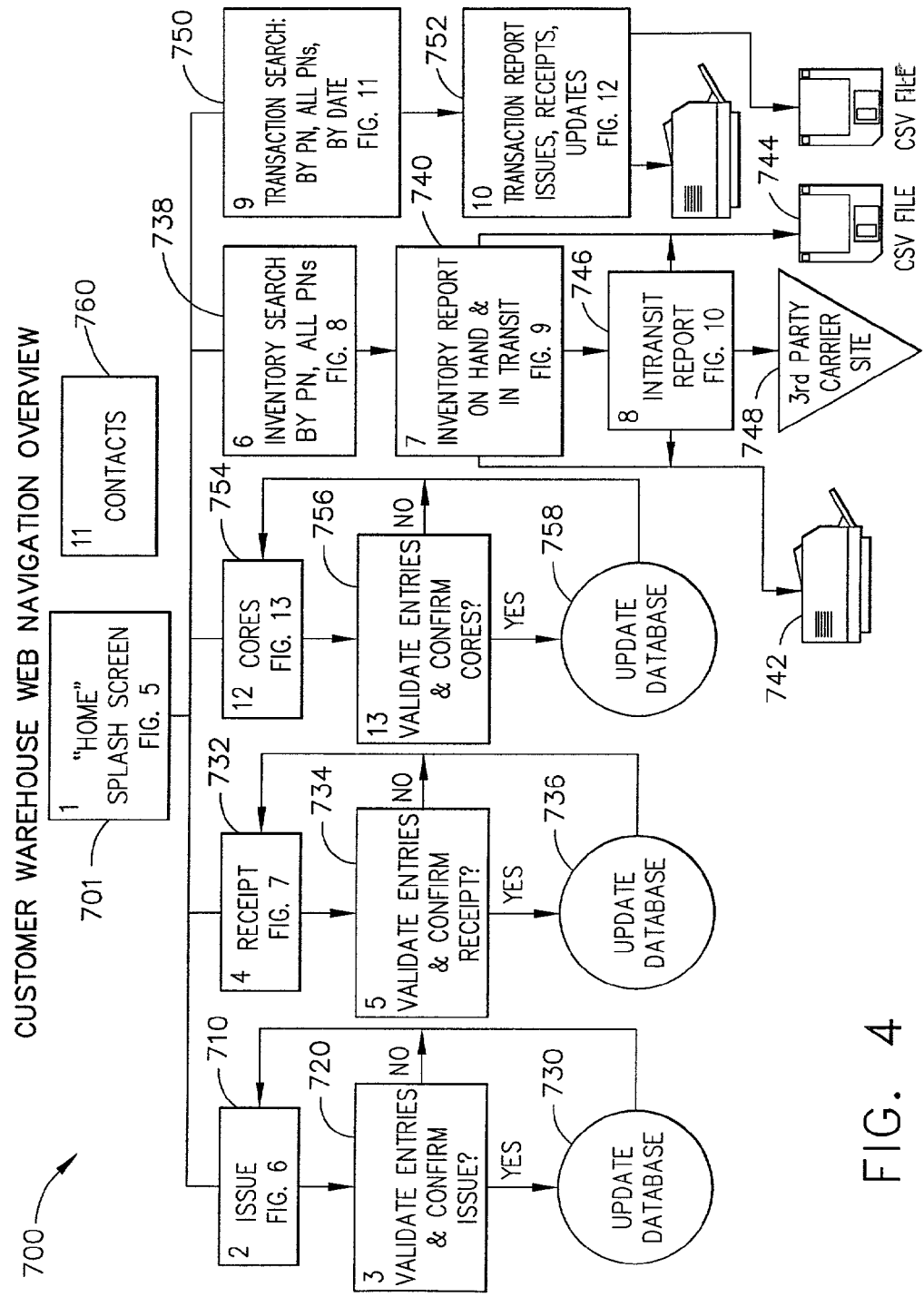
FIG. 4 is a Web site diagram depicting the relationships between components of a Web site within an embodiment of a storefront system according to the present invention.

FIG. 4 is a Web site diagram depicting the relationships between components of a Web based embodiment of a virtual storefront process according to the present invention. The Web based virtual storefront process is embodied in a storefront Web site 700 served by a storefront Web server 200 (FIG. 2). A storefront home page 701 introduces the virtual storefront to a customer. An exemplary storefront home page is shown in FIG. 5

Figure 5:
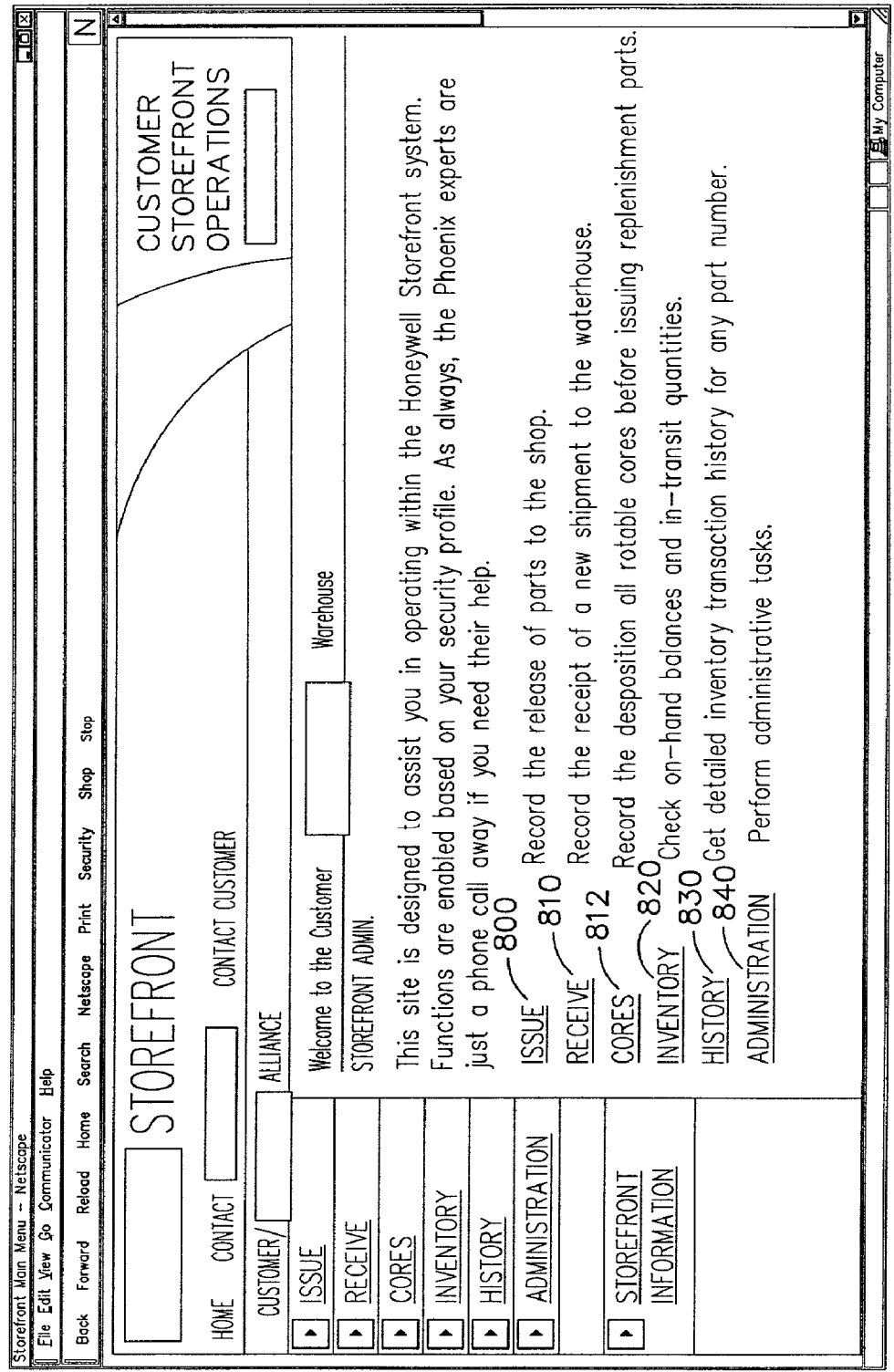
FIG. 5 is a home page within an embodiment of a storefront system according to the present invention.

FIG. 5 is a home page for one embodiment of a virtual storefront according to the present invention. The store front home page includes links to an issue document 800, a receive document 810, a core disposition document 812, an inventory document 820, a history document 830, and an administration document 840.

Referring again to FIG. 4, the home page 701 has a link to an issue document 710. The issue document allows a customer to enter part issue instructions and submit the part issue instructions to the storefront process.

Figure 6:
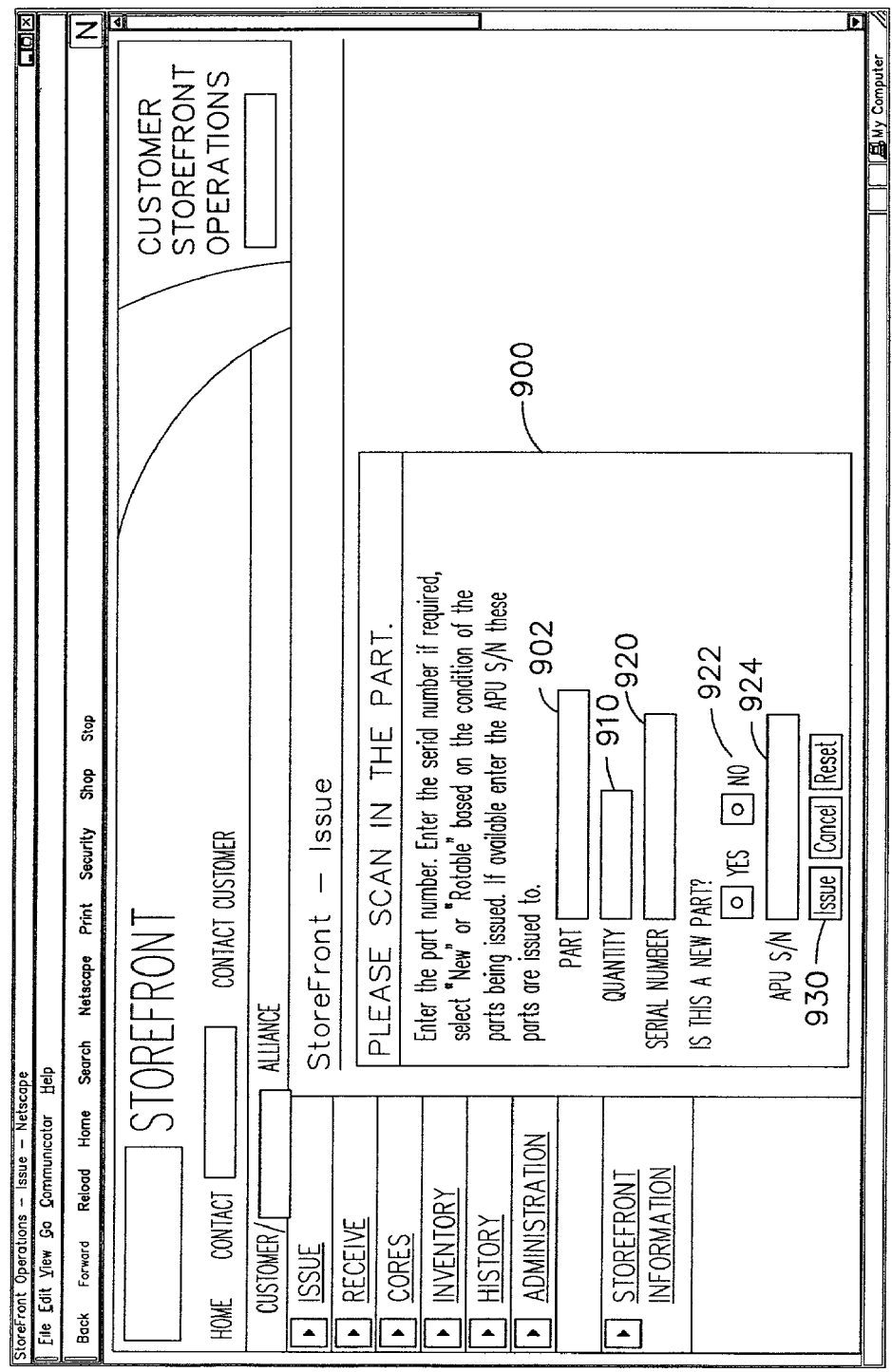
FIG. 6 is a parts issue document within an embodiment of a storefront system according to the present invention.

FIG. 6 is a parts issue document according to one embodiment of the present invention. A customer selects a part from the secure area and fills in a form 900 for submission to the Web server using information found on the part. The customer enters a part number into field 902 and a quantity of parts to be issued 910. For serialized part numbers, the serial number for the part is entered into data field 920.

When a part number is added to a customer's storefront, a flag is set in the database to indicate whether or not the part is available in both new and rotable conditions. If the part is available in both new and rotable conditions, the customer selects whether or not to issue a new part 922. If the customer chooses not issue a new part, the storefront system will attempt to issue a rotable part to the customer.

Each part may be included in a larger assembly. Assembly serial number data field 924 is used by the customer to enter a serial number of an assembly to which the part will belong when the part is issued.

The customer then selects the issue button 930 and the form is submitted to the storefront process for processing.

The parts issue page includes a supplier contact 940 link for contacting the supplier administrator and a customer contact link 950 for contacting the customer administrator of the virtual storefront.

In one embodiment of the parts issue document, the document includes instructions for filling out the parts issue form using data collected from a barcode scanner used to scan a part's packaging label.

Referring again to FIG. 4, the store front process receives the submitted parts issue form, validates the parts issue information, and confirms the parts issue 720. If the parts issue is not confirmed, the parts issue document is sent to the customer so that the customer can attempt to fill out the parts issue form again. If the parts issue is confirmed, the virtual storefront process updates 730 the previously described storefront database. The storefront database is updated by decrementing the inventoried part count by the number of parts issued in the transaction.

The virtual storefront home page contains a link to a parts receiving document 732.

Figure 7:
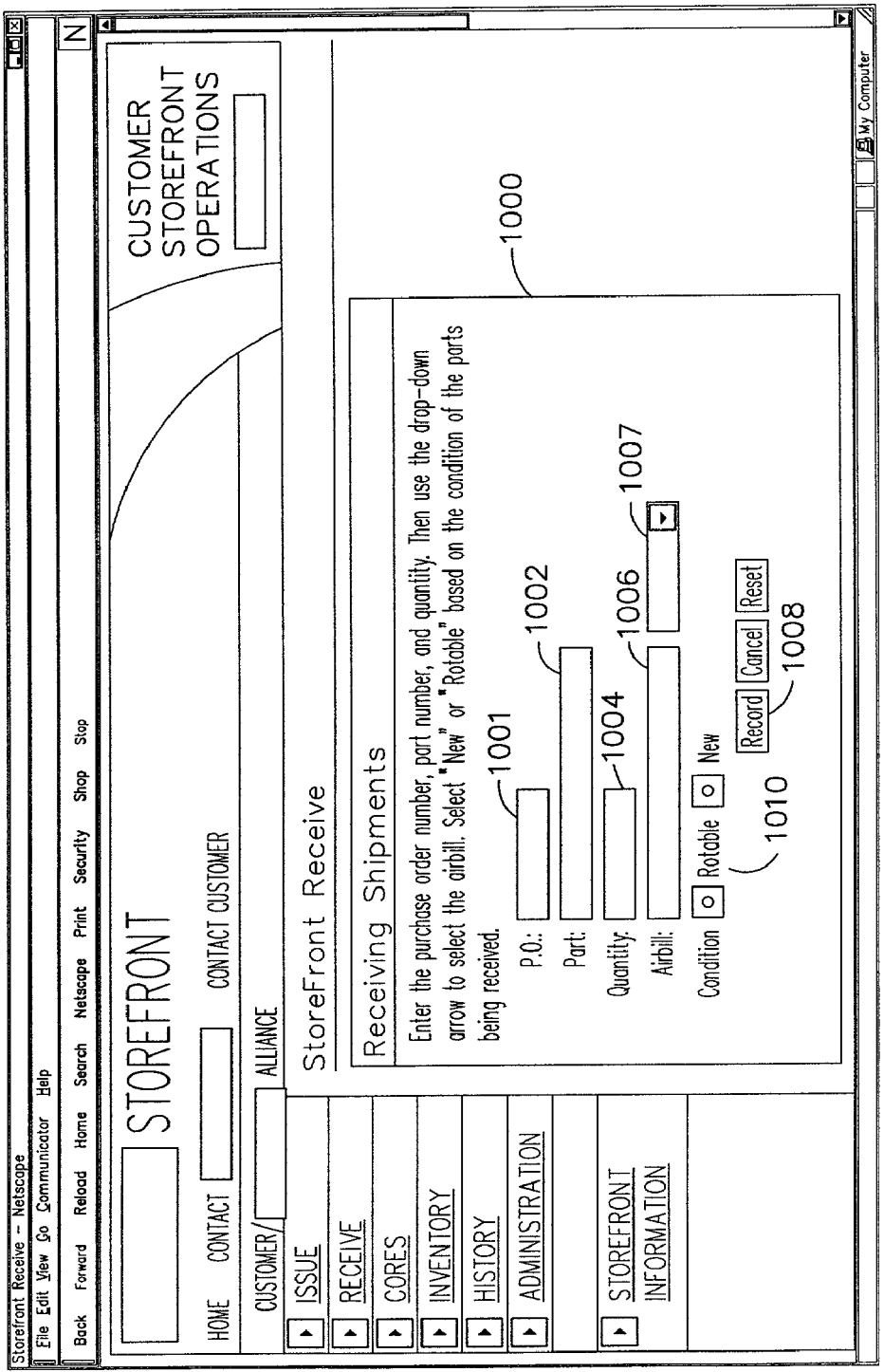
FIG. 7 is a parts receiving document within an embodiment of a storefront system according to the present invention.

FIG. 7 is a parts receiving document according to one embodiment of the present invention. As previously described, the supplier sends replenishment shipments to the customer and the customer receives the parts in the replenishment shipment into the previously described secure area. The parts receiving document includes a parts receiving form 1000 for entering information about the received parts. A purchase order field 1001 contains the purchase order number of the replenishment shipment. A part field 1002 contains the part number of a part in the replenishment shipment. A quantity field 1004 contains the number of parts with the same part number in the replenishment shipment. An waybill field 1006 is for the entry of a shipping tracking number. In the case where multiple waybill numbers are identified for a customer, the customer can select an waybill number from a list displayed in a waybill list data field 1007.

The customer identifies parts as either new or rotable and select the "Rotable" or "New" radio buttons 1010 to indicate to the storefront server what kind of parts were received. The customer fills out the parts receiving form and selects the Record button 1008 to receive the parts into the secure area and update the storefront database.

In one embodiment of the parts receiving document, the parts receiving document includes instructions for filling out the parts receiving form using data collected from a barcode scanner used to scan a part's packaging label.

Referring again to FIG. 4, after submission of the parts receiving form, the virtual store front process validates the entry information and confirms the receipt of the parts 734. If the received parts are valid parts, the storefront database is updated 736. If the received parts are not validated, the virtual storefront process gives the customer another opportunity to submit a new parts receiving form 732.

The virtual storefront home page contains a link to an inventory report request document 738.

Figure 8:
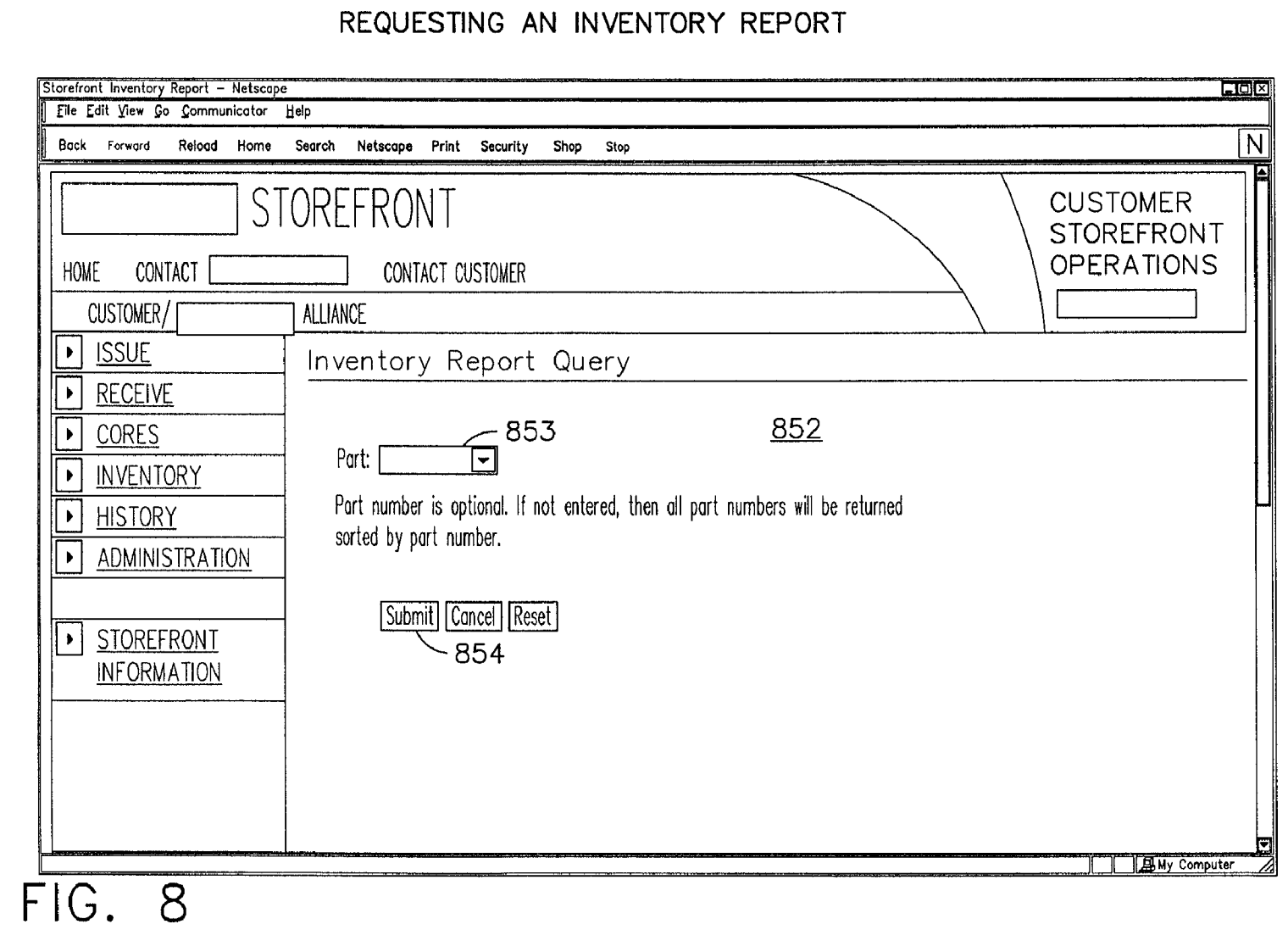

FIG. 8 is an inventory report request document according to one embodiment of the present invention. The inventory report request includes an inventory report request form 852. The inventory report request form includes a part number field 853 for entry of a part number. A customer enters a part number and selects a submit button 854 to submit the inventory report request form to the virtual storefront process.

Referring again to FIG. 4, the virtual storefront process generates 740 an inventory report based on the information entered into an inventory report request form by a customer. An inventory report is generated by querying the previously described storefront database for inventory information for the part number entered by a customer in the inventory report request form. If the customer does not enter a part number into the inventory report request form, then a report is generated for all part numbers inventoried in the secure area.

Figure 9:
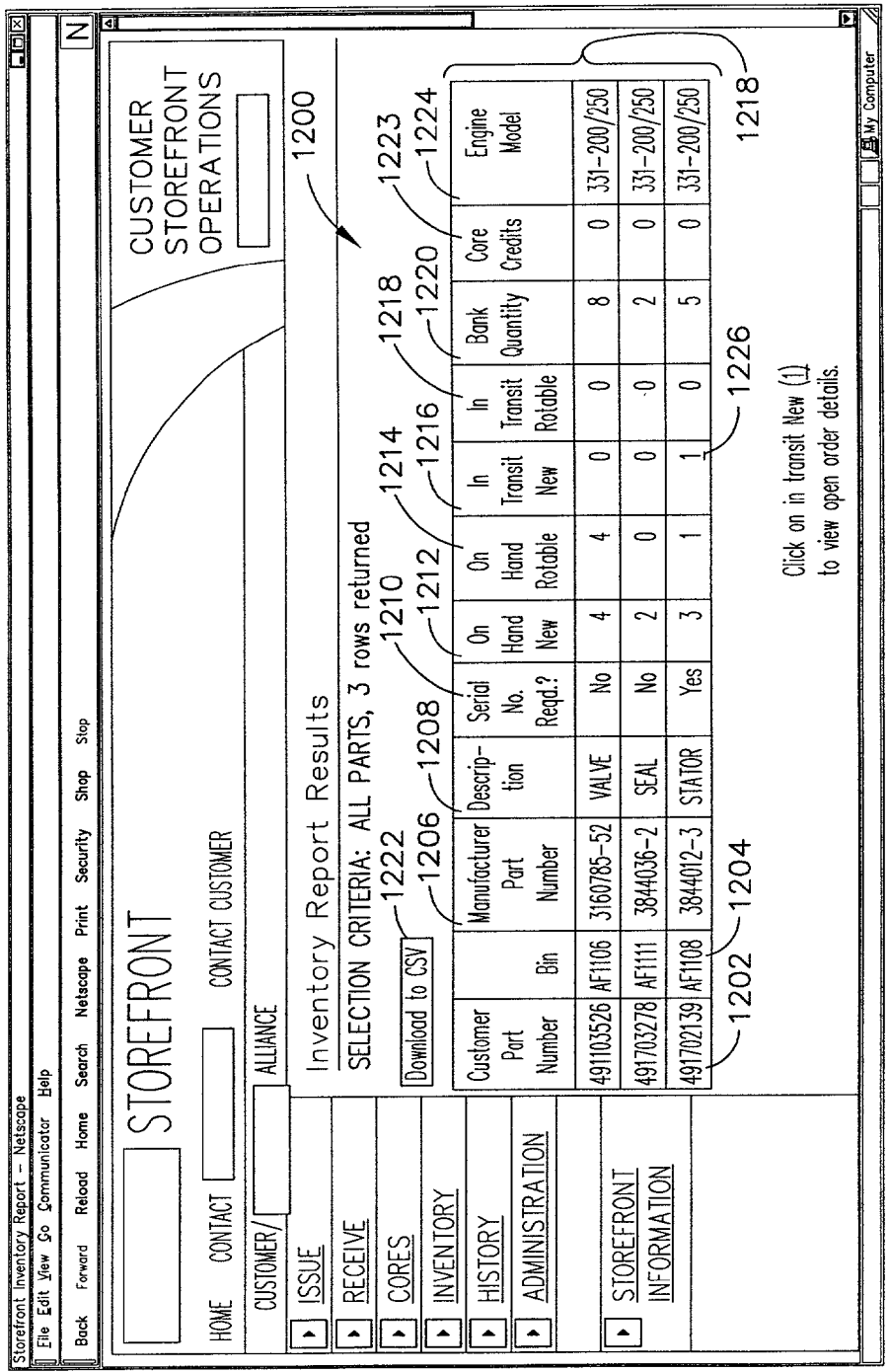
FIG. 9 is an inventory and in-transit tracking document within an embodiment of a storefront system according to the present invention.

FIG. 9 is an inventory report document as generated by one embodiment of the present invention. The inventory report document includes an inventory report table 1200 comprised of one or more rows of database records 1218. Each database record is comprised of data fields for data describing parts inventoried in the secure area. The database records are organized by part number with one data record corresponding to one part number.

A customer part number data field 1202 contains a customer's internal part number for the inventoried part.

A bin number data field 1204 contains the bin where the inventoried part is stored in the secure area.

A manufacturer's part number data field 1206 contains a manufacturer's part number of an inventoried part.

A keyword data field 1208 contains a word or short phrase describing the function of the part.

A serial number required data field 1210 contains a flag indicating whether or not the an individual part is tracked using a serial number.

A new quantity on hand data field 1212 contains the number of new parts inventoried in the secure area.

A rotable quantity on hand data field 1214 contains the quantity of rotable parts inventoried in the secure area.

A new quantity in transit data field 1216 contains the number of new parts in a replenishment shipment that have not arrived at the customer facilities.

A rotable quantity in transit data field 1218 contains the number of rotable parts in a replenishment shipment that have not arrived at the customer facilities.

A bank quantity data field 1220 contains the maximum number of supplier owned parts to be stored in the secure area.

A core credit quantity data field 1223 contains the number of cores scrapped or returned by the customer minus the number of new or rotable parts issued from the secure area.

An engine model data field 1224 contains the model number of a larger assembly for which a part is used as a repair part.

The inventory report table contains an in-transit inventory report link 1226 to a tracking in-transit inventory document if there are parts in-transit to the secure area from the supplier. In this exemplary inventory report table, there is one part in-transit from the supplier. The number of parts in-transit is included in the table as the in-transit inventory report link if there are parts in-transit. Selecting the parts in-transit number allows a customer to track the parts in-transit through a third party carrier's Web site.

The inventory report document includes a download button 1222 for downloading the inventory report document in an alternative format such as Comma Separated Value (CSV) format. A customer selects this button to generate and locally store a CSV file comprising the data included in the inventory report document.

Referring again to FIG. 4, the inventory report document can be printed on a printer 742 by the customer or the inventory report table included in the inventory report document can be printed to a CSV file 744.

The customer has the option to track a replenishment shipment in transit by selecting an in-transit inventory report link in the inventory report document as previously described. The in-transit inventory report link is a link to a third party carrier Web site 748. The third party carrier Web site is accessed through a series of in-transit inventory tracking documents.

Figure 10:
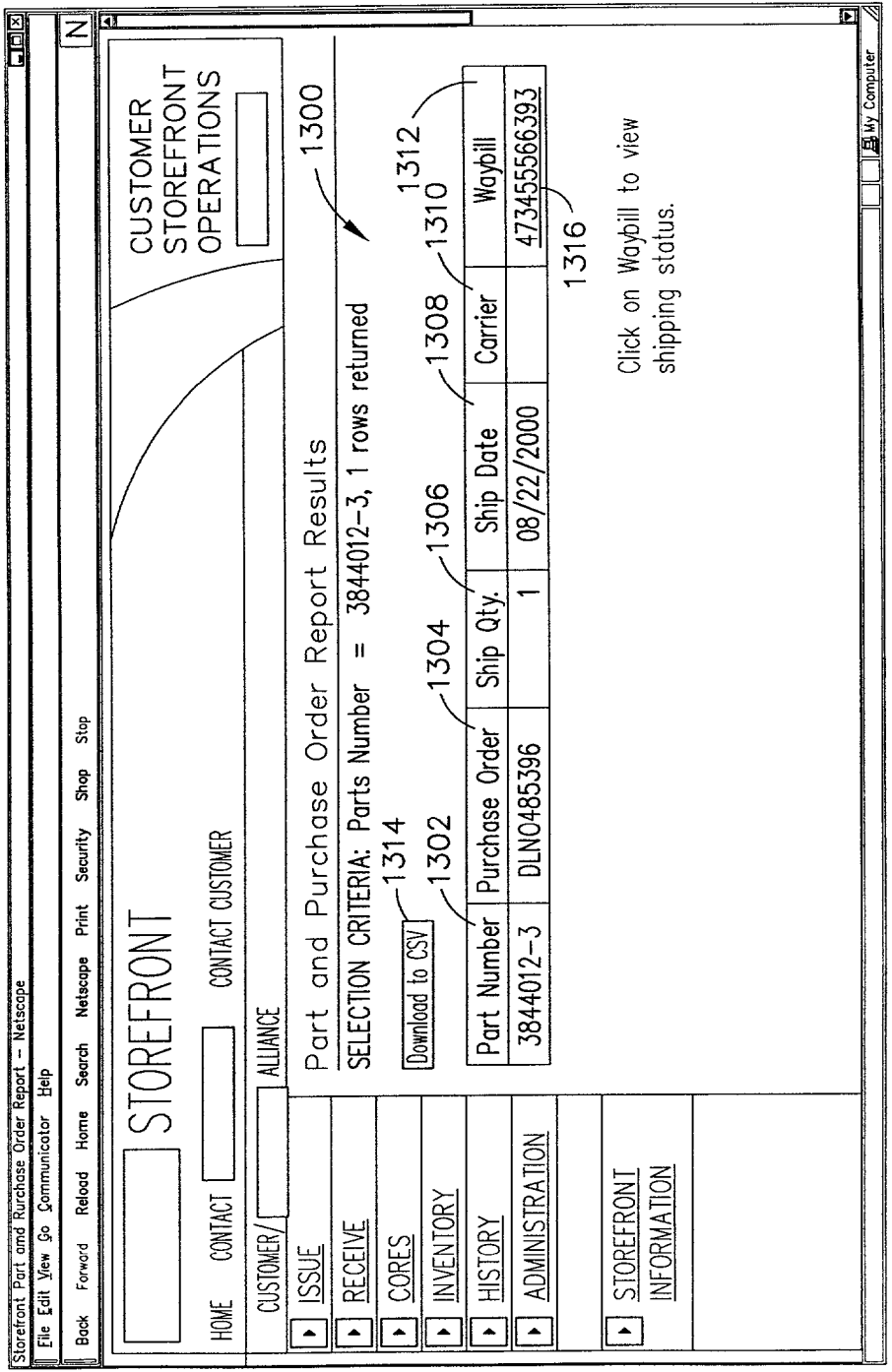
FIG. 10 is another in-transit tracking document within an embodiment of a storefront system according to the present invention.

FIG. 10 is an inventory in-transit tracking document according to one embodiment of the present invention. The in-transit tracking document is reached by selecting the in-transit inventory report link in the inventory report document as previously described. The in-transit tracking document includes a in-transit tracking table 1300 containing information about a replenishment shipment. The in-transit tracking table includes a plurality of data fields describing the replenishment shipment. A part number data field 1302 contains the part number of a part in a replenishment shipment. A purchase order data field 1304 contains the number of the purchase order under which the part in the replenishment shipment was ordered. A shipping quantity data field 1306 contains the number of parts with the indicated part number in the replenishment shipment. A ship date data field 1308 contains the date the replenishment shipment was sent from the supplier. A carrier data field contains the name of the third party carrier. A waybill data field 1312 contains the waybill number of the replenishment shipment.

The in-transit tracking document includes a download to in-transit tracking report to CSV button 1314. A customer selects the download to in-transit tracking report to CSV button to create a local copy of the in-transit tracking report in a CSV format.

The waybill number is used as a link 1316 to a third party carrier's Web site. Selecting the waybill link links a customer to a third party carrier's Web site. Establishment of the link to the third party carrier's Web site includes posting the waybill number to the Web site so that the third party carrier's Web site can be used to track an in-transit replenishment shipment.

Referring again to FIG. 4, the virtual storefront home page is linked to a transaction history request document 750.

Figure 11:
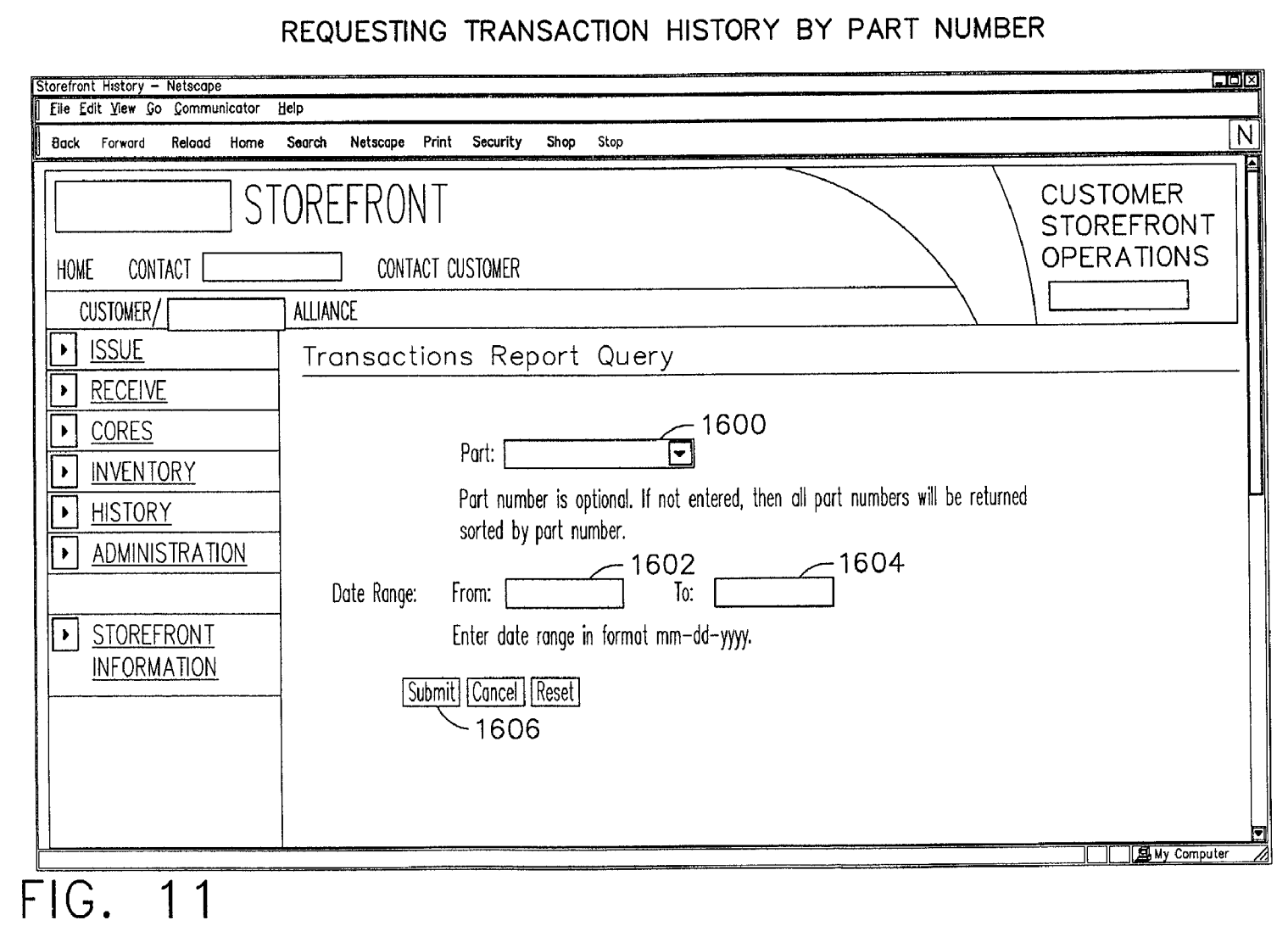

FIG. 11 is transaction history request document according to one embodiment of the present invention. The transaction history request document includes a part number entry field 1600 for entry of a part number, a from date field 1602 and a to date field 1604. A customer enters a part number, a from date and a to date and selects the submit button 1606 to request a transaction history for all parts with the entered part number during the period of time bracketed by the from and to dates. If the customer does not enter a part number, all transactions that occurred during the bracketed time period will be reported.

Referring again to FIG. 4, the virtual storefront home page is linked to a transaction history report document 752.

Figure 12:
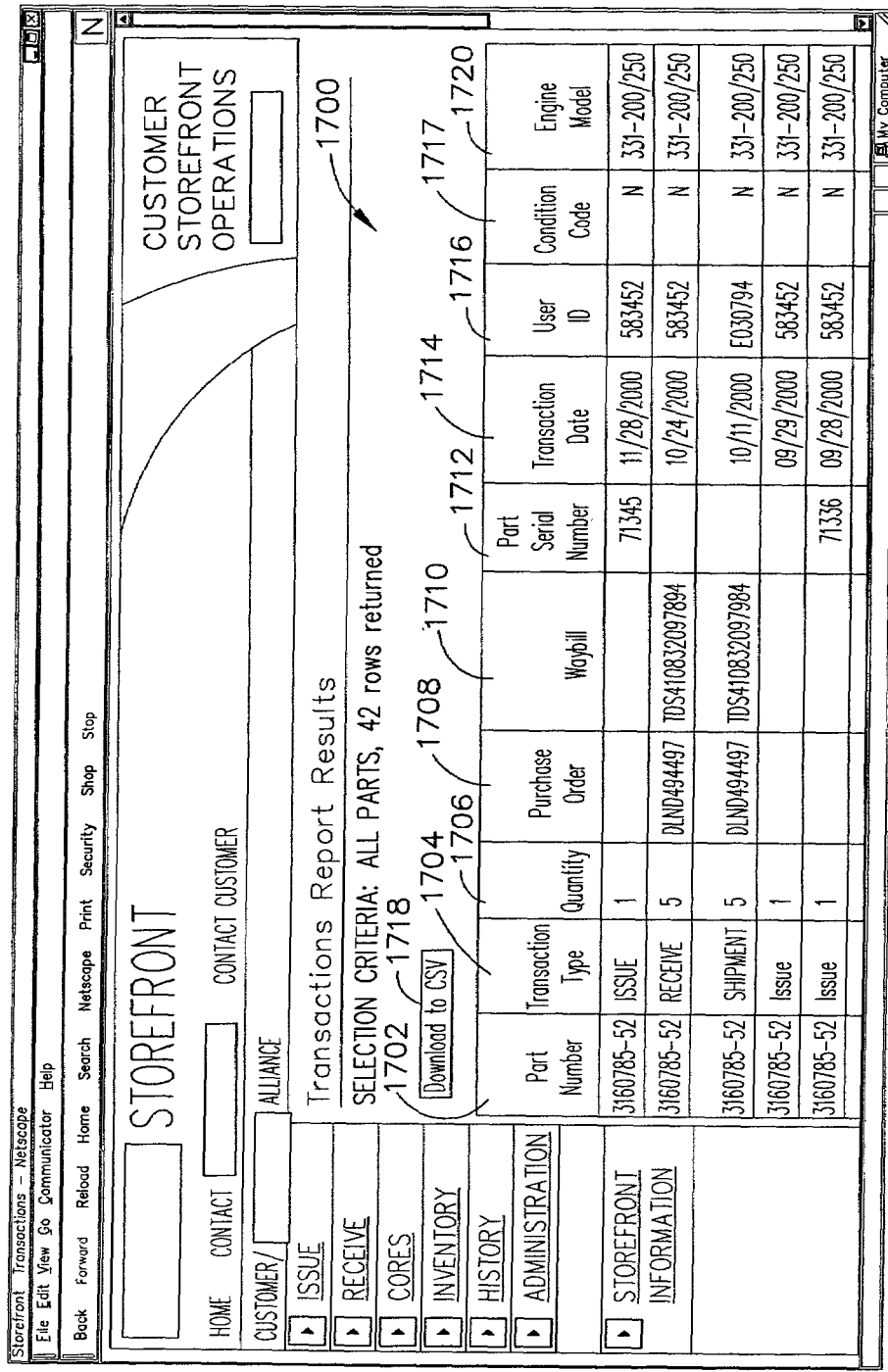
FIG. 12 is a usage history document within an embodiment of a storefront system according to the present invention.

FIG. 12 is a transaction history report document for a single part number according to one embodiment of the present invention. The transaction history report document includes a transaction history report table 1700. The transaction history report table includes a plurality of data fields describing each transaction involving a part with a specified part number.

A part number data field 1702 the part number of a part or parts issued from, received into, or in-transit to a secure area.

A transaction type data field 1704 describes the transaction involving the part or parts. The value in the data field can be "ISSUE" if the part or parts were issued from the secure area, "RECEIVE" if the part or parts were received into the secure area, "SHIPMENT" if the part or parts are in-transit to the secure area, "RETURN" if a core or cores were returned to the supplier, or "SCRAP" if the core or cores were scrapped by the customer.

A quantity data field 1706 contains the number of parts involved in a transaction.

A purchase order data field 1708 contains the purchase order under which the part or parts were ordered for a replenishment shipment.

A waybill data field 1710 contains the waybill number of the replenishment shipment to which the part or parts belong.

A part serial number data field 1712 contains the serial number of the issued part.

A transaction date data field 1714 contains the date of the transaction.

A user id data field 1716 contains the user id of the person issuing or receiving a part or parts.

A condition code data field 1717 contains the type of part issued, whether rotable or new.

An engine model data field 1720 contains the model number of a larger assembly to which a part belongs.

The transaction history report document includes a download transaction history report table to CSV button 1718. A customer selects the download transaction history report table to CSV button to create a local copy of the download transaction history report table in a CSV format file.

Referring again to FIG. 4, the virtual storefront home page is linked to a core disposition document 754.

FIG. 13 is a core disposition document within an embodiment of a storefront system according to the present invention. The core disposition document comprises a core disposition form 1320. A customer uses the core disposition form to inform the virtual storefront system of what the customer intends to do with a core. The customer enters a part number into part number field 1322 and a quantity of cores to be processed in quantity field 1324. The customer then selects either the "Scrap" button 1326 or the "Rework" button 1328 to select whether or not the core or cores are to be scrapped or reworked. The customer then fills out a purchase order number field 1330 with a purchase order number. The customer also fills out a waybill number field 1332 with the waybill number of the shipment being sent to the supplier and selects the shipping carrier from a shipping carrier pulldown list 1334. The customer then selects a "Record" button 1336 to send the form to the storefront inventory information stored in the storefront database.

Referring again to FIG. 4, the virtual storefront validates 756 the core disposition information submitted in the core disposition form and updates 758 the supplier's database.

Each page of the Web site includes a link to a contacts 760 Web page containing phone number and email addresses of both the supplier and the customer responsible for the content of the storefront database.

Figure 14:
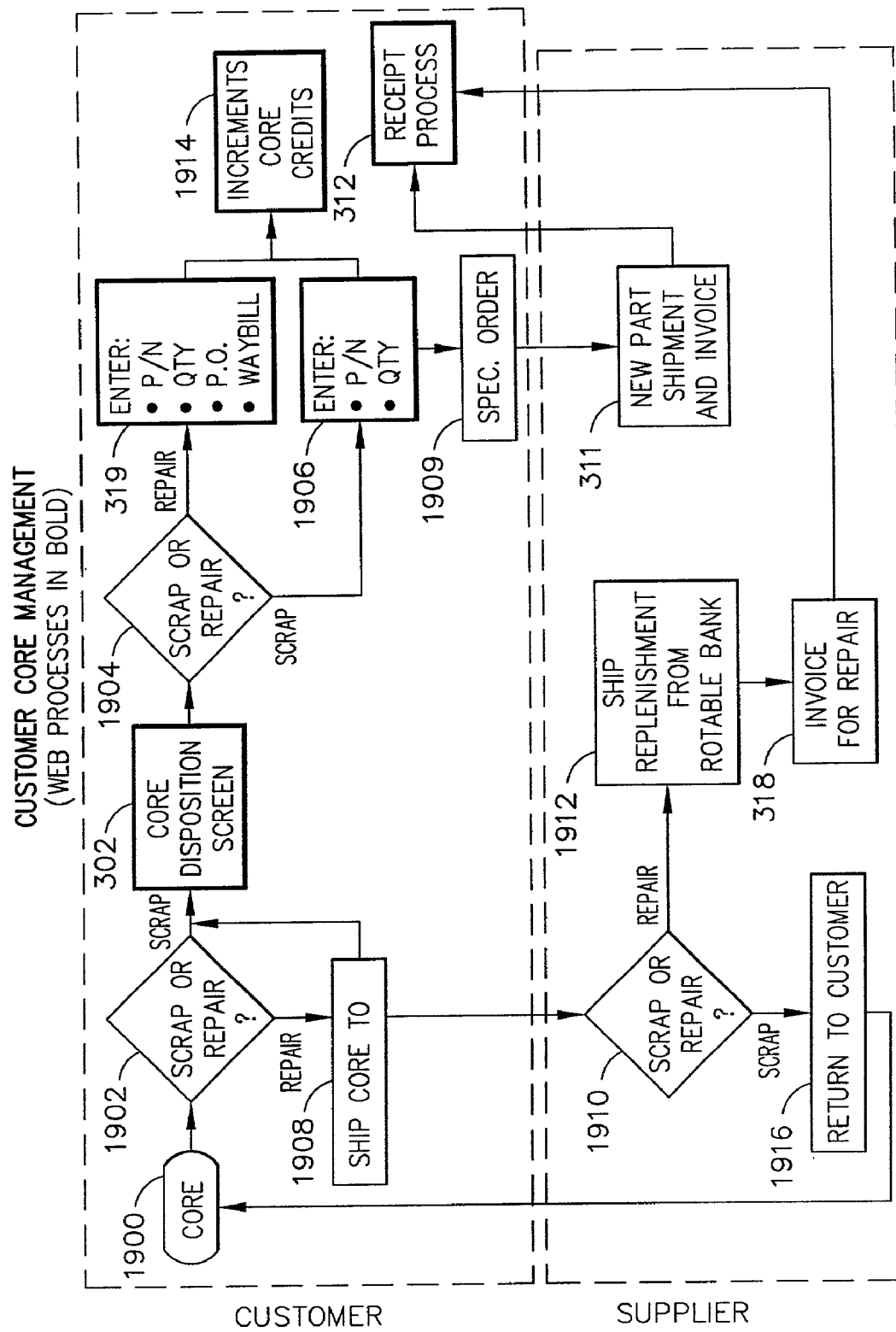
FIG. 14 is a process flow diagram of a core management process within an embodiment of a storefront system according to the present invention.

FIG. 14 is a process flow diagram depicting a process for accepting cores using a Web based user interface according to an embodiment of the present invention. The Web based user interface is used to implement the user interface for the previously described virtual storefront process hosted by a Web server. The Web based user interface comprises a series of linked documents with each document including forms including data fields for user data entry as previously described.

A customer analyzes 1902 a core 1900 and a decision is made whether to scrap or rework the core. A core disposition document 302 is requested from the previously described storefront Web site 700 (FIG. 4) by a customer. The decision to scrap the part is entered 1904 into the core disposition document by the customer. The customer enters the part number and number of cores to be scrapped 1906 and a purchase order is generated 1909 to order a replenishment shipment to replace the scrapped cores. A new part shipment invoice 311 is generated by the storefront process. The new parts are received 312 into the secure area once the new parts have arrived at the customer's site.

If the core is to be reworked, the customer ships the core 1908 to the supplier and enters the part number, number of cores, a purchase order number, and the shipping waybill into the Web based user interface 319 as previously described.

The supplier receives the core and determines 1910 if the core is suitable for reworking. If the supplier determines that the core cannot be reworked, the core is returned to the customer 1916. If the core is to be reworked, a rebuilt part is shipped from a set of already rebuilt parts 1912 and an invoice is generated 318 for rebuilding the core. The shipped rebuilt part is received into the secure area 312 as previously described.

Figure 15:
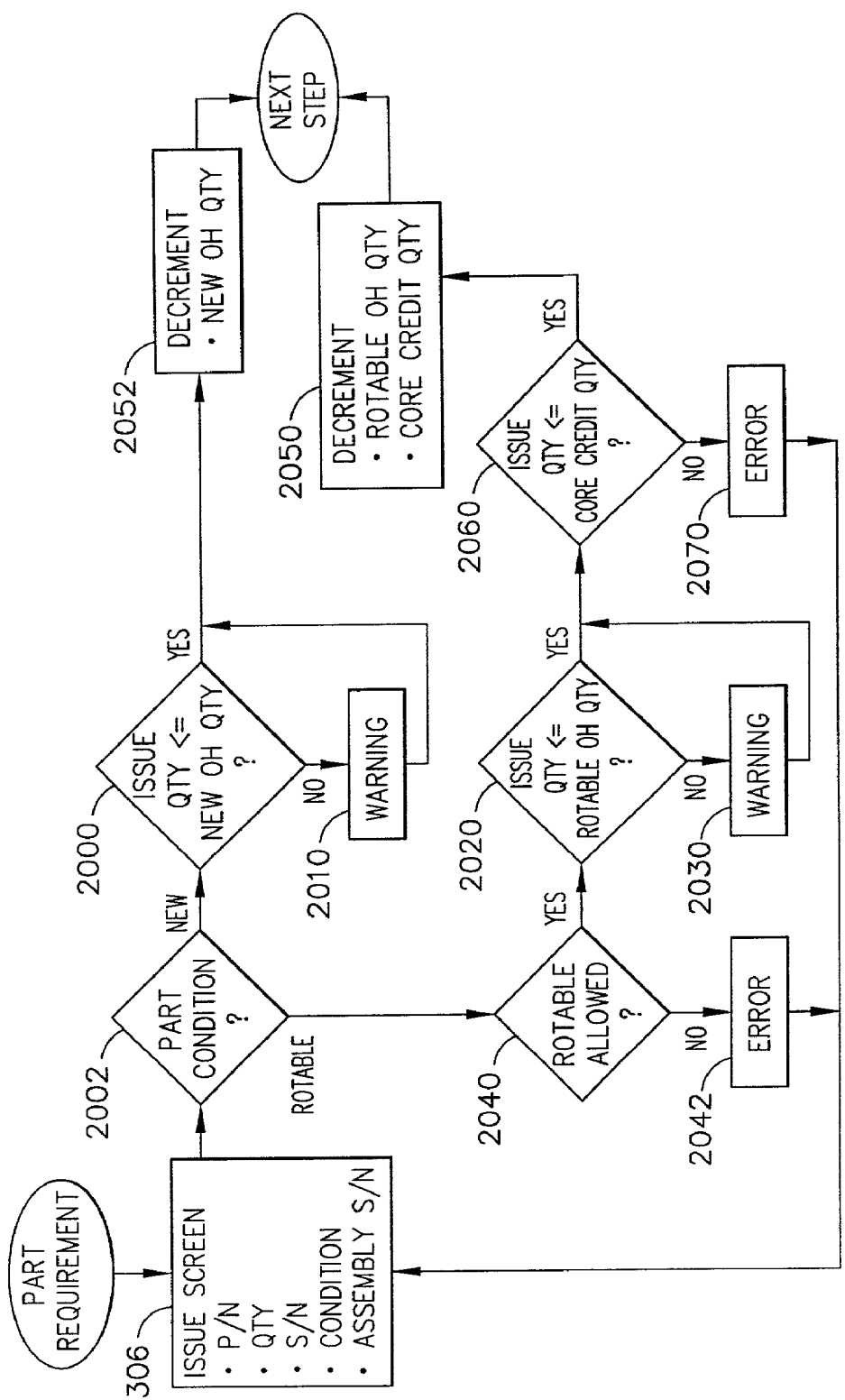
FIG. 15 is a process flow diagram of a part issue process within an embodiment of a storefront system according to the present invention.

FIG. 15 is a process flow diagram depicting a process for issuing parts using a Web based user interface according to one embodiment of the present invention. The Web based user interface is used to implement the user interface for the previously described virtual storefront process hosted by a Web server. The Web based user interface comprises a series of linked documents with each document including forms including data fields for user data entry as previously described.

A customer fills out a part issue form 306 with part issue information including entry of a part number, the quantity of parts to be issued, the serial number of the parts, and the serial number of an assembly in which the parts will be used 306. The customer enters the condition of the parts, whether new or rotable, in order to select either new or rotable parts 2002.

If the customer selects new parts, the virtual storefront process determines if the quantity of new parts to be issued is less than or equal to the number of new parts on hand 2000. If the quantity of desired new parts is too great, then the customer is issued a warning message 2010 and the customer is allowed to issue the number of parts remaining on-hand in a secure area. The number of on-hand parts in the secure area is decremented 2052.

If the customer is requesting a rotable part rather than a new one, the virtual storefront process determines if it is possible to issue the part as a rotable part 2040. If the part requested by the customer cannot be issued as a rotable part, then an error message is generated 2042 and the user is asked to renter the part request information.

If a requested part can be issued as a rotable part, the virtual storefront process determines if the quantity of rotable parts to be issued is less than or equal to the number of rotable parts on hand 2020. If the quantity of desired rotable parts is too great, then the customer is issued a warning message 2030 and the customer is allowed to issue as many rotable parts as there are on-hand in a secure area.

The virtual storefront process determines if the customer has turned in enough cores and therefore has enough core credits to cover the desired quantity of issued rotable parts 2060. If the customer does not have enough cores credited to their account, then an error is generated 2070 and the customer must reenter the part issue information.

If the customer does have enough core credits, then a new or rotable part is issued and the customer's core credit is decremented by the amount of issued parts 2050. The number of on hand parts is also decremented in order to update the secure area parts inventory.

Figure 16:
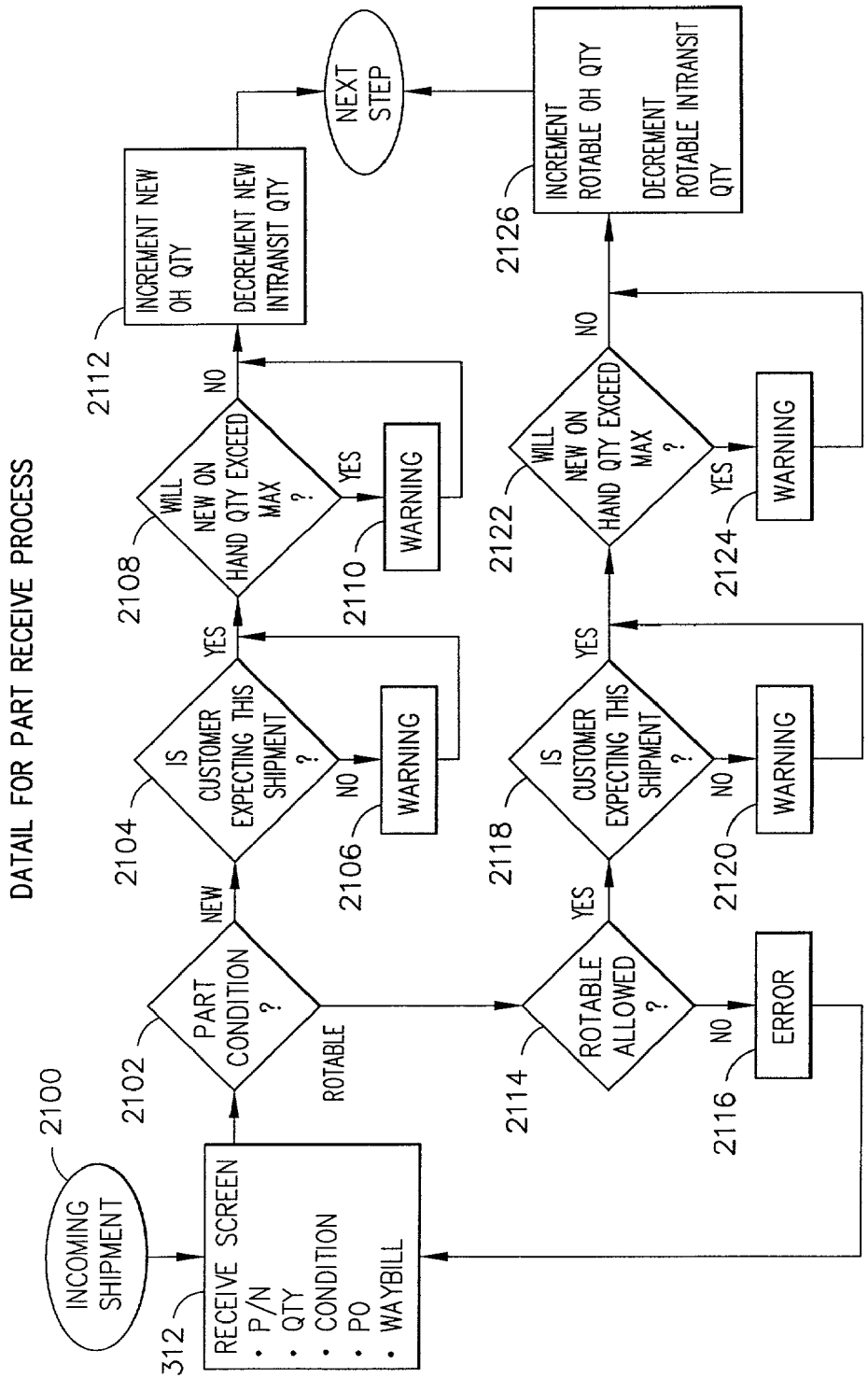
FIG. 16 is a process flow diagram of a part receiving process within an embodiment of a storefront system according to the present invention.

FIG. 16 is a process flow diagram of a part receiving process within an embodiment of a storefront system according to the present invention. A customer receives an incoming shipment 2100 from the supplier and fills out a part receiving form 312 with part receiving information including a part number, the quantity of parts received, whether or not the received parts are new parts or rotable parts, a purchase order number associated with the parts shipment, and the waybill number of the parts shipment.

If the received parts are new 2102, then the storefront system determines if a purchase order was issued by the customer and the customer is therefore waiting for the parts 2104. If the incoming shipment cannot not be matched to a purchase order issued by the customer, the customer is warned 2106.

If the received new parts exceed the amount of new parts needed to bring the total number of new parts in a secure area to the maximum on-hand quantity 2108, the customer is warned 2110.

Once the parts are received, the number of on-hand parts in a secure area is incremented 2112 and the part shipment is removed from a quantity of in-transit new parts tracked by the storefront system.

If the received parts are rotable, the storefront system confirms that rotable parts are allowed 2114. If rotable parts are not allowed, then an error message is generated 2116 and the parts shipment is rejected.

If rotable parts are allowed, the storefront system determines if a purchase order was issued by the customer and the customer is therefore waiting for the rotable parts 2118. If the incoming shipment cannot not be matched to a purchase order issued by the customer, the customer is warned 2120.

If the received rotable parts exceed the amount of rotable parts needed to bring the total number of rotable parts in a secure area to the maximum on-hand quantity 2122, the customer is warned 2124.

Once the rotable parts are received, the number of on-hand parts in a secure area is incremented 2126 and the part shipment is removed from a quantity of in-transit rotable parts tracked by the storefront system.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the claims supported by this application and their equivalents rather than the foregoing description.

What is claimed is:

1. A data processing system adapted to manage transfer of parts stored in a secure area by a supplier to a customer via a computer network, comprising:
   a storefront database having secure area inventory information stored therein;
   a processor in operable communication with the storefront database, and configured to selectively communicate with a customer client and a supplier client via the computer network; and
   a memory operably coupled to the processor and having program instructions stored therein, the processor being operable to execute the program instructions, the program instructions including:
   receiving secure area part reception information from the customer client via the computer network;
   updating the secure area inventory information stored on the storefront database using the secure area part reception information;
   receiving secure area part issuing information from the customer client via the computer network; and
   updating the secure area inventory information using the secure area part issuing information.

2. The data processing system of claim 1, wherein the secure area is located at a site controlled by the customer.

3. The data processing system of claim 1, wherein the secure area is located at a neutral site.

4. The data processing system of claim 1, the program instructions further including:
   generating by the data processing system a new part invoice when a new part is being issued according to the secure area part issuing information; and
   generating by the data processing system a fixed price invoice for rebuilding a rotable part core when a rotable part is being issued according to the secure area part issuing information.

5. The data processing system of claim 1, wherein the storefront database is a neutral database.

6. The data processing system of claim 1, the program instructions further including:
   receiving by the data processing system from the customer client via the computer network customer identification information;
   accessing a customer profile database including customer document customization information associated with customer identification information;
   retrieving by the data processing system from the customer profile database customization information using the customer identification information; and generating by the data processing system customized documents using the customization information.

7. The data processing system of claim 1, the program instructions farther including:

receiving by the data processing system from the customer client via the communications network core return information including a quantity of cores returned;

incrementing a core credit by the quantity of cores returned;

receiving by the data processing system from the customer client via the communications network rotable part issue information including a quantity of rotable parts to issue; and updating the secure area information if the quantity of rotable parts to issue is not greater than the core credit quantity.

8. The data processing system of claim 1, the program instructions further including:

storing in-transit shipment information in the storefront database, the in-transit shipment information including waybill number from a carrier for accessing shipment status information from a carrier Web server; and receiving by the data processing system from a client via the computer network an in-transit shipment query; and generating by the data processing system an in-transit document including a hypertext link to the carrier Web server, the hypertext link comprising the waybill number.

9. The data processing system of claim 1, the program instructions further including:

maintaining by the data processing system in the storefront database a history of part transactions for a secure area;

receiving by the data processing system a part transaction history request from a client via the computer network, the part transaction history request including a part number; and generating by the data processing system a part history report document using the history of part transactions and the part number.

10. The data processing system of claim 9, the part history report document further including a link to an alternatively formatted part history report document.

* * * * *